United States Patent

[11] 3,620,878

| [72] | Inventor | James L. Guthrie |
| | | Ashton, Md. |
| [21] | Appl. No. | 747,826 |
| [22] | Filed | July 26, 1968 |
| [45] | Patented | Nov. 16, 1971 |
| [73] | Assignee | W. R. Grace & Co. |
| | | New York, N.Y. |

[54] BONDING WITH ETHYLENE COPOLYMER ADHESIVE AND ADHESION PROMOTING AGENT
1 Claim, No Drawings

[52] U.S. Cl. ................................................ 156/309,
156/311, 156/312, 156/331, 156/332, 156/334,
260/31.8 R, 260/31.8 J
[51] Int. Cl. .................................................. C09j 3/14
[50] Field of Search .......................................... 260/878,
31.8 J, 31.8 R; 156/332, 334, 309, 311, 312, 331

[56] References Cited
UNITED STATES PATENTS

| 3,369,003 | 2/1968 | Verdol ....................... | 260/78.5 |
| 3,442,745 | 5/1969 | Salyer et al. ................. | 156/332 |
| 3,484,339 | 12/1969 | Caldwell ....................... | 161/231 |
| 3,035,011 | 5/1962 | Bartl et al. ................... | 260/45.5 |

FOREIGN PATENTS

| 946,384 | 1/1964 | Great Britain ............... | 260/878 |

Primary Examiner—Carl D. Quarforth
Assistant Examiner—E. A. Miller
Attorneys—Richard P. Plunkett and Kenneth E. Prince ABSTRACT: Polar copolymers of alpha-olefins containing pendant ester, amide, anhydride or carboxylic acid groups may be bonded to wood, metal or other substrates by blending di- or polycarboxylic acids in the approximate proportions of 1-15 percent into the polar copolymers. The di- or polycarboxylic acids when compounded in the copolymer develop peel strengths of approximately from 30-70 lbs./inch when interposed between metallic or wood sheets and held under pressure from 1-15 minutes at temperatures above the melting point of the copolymer.

BONDING WITH ETHYLENE COPOLYMER ADHESIVE AND ADHESION PROMOTING AGENT

This invention relates to a method of bonding metal or wood substrates with polymeric material.

The bonding of polymers to metal has presented difficulties for many years. In the past, bonding of rubber to steel called for complicated techniques and often involved the use of metal adhesives of complex formulations. Other methods included cleaning the metal copper of brass plating it, and then curing the thermoplastic against the metal, preferably after the thermoplastic had been acidified.

In certain instances, when substances other than Hevea rubber were to be bonded, adhesion could only be secured by grafting polar functional groups on to the polymer. Carboxylic acid groups were particularly effective.

In practically all cases where adhesion was demanded, the metal also had to receive special treatment, as the brass plating in rubber-bonding shows. In other cases, special cementing compositions are used to bond polymers to metal. However, in a considerable number of instances, the melting point of these special cements was very much below the softening points of the thermoplastic so that the usefulness of some cementing techniques was confined to situations where the joined parts would not be subjected to elevated temperatures.

I have discovered that the polar copolymers of alpha-olefins containing pendant ester, amide, anhydride or carboxylic acid groups may be bonded to metal or wood substrates without resort to the difficult and sometimes tricky adhesion procedures which are now necessary, if the copolymer is compounded with a minor proportion of a di- or polycarboxylic acid, examples of which are maleic, terephthalic, fumaric, succinic, and phthalic acids or polycarboxylic compounds such as pyromellitic acid. The compounded material will bond to steel or phosphated steel, merely by pressing the mass against the steel substrate while maintaining the temperature above the melting point of the copolymer. On cooling, the bonded material will exhibit surprisingly high-peel strengths. When carboxylated polyethylene resin is the base polymer, peel strengths comparable to sweated, soldered lap joints will be secured.

In carrying out the invention, I mill or otherwise blend into the polymer approximately 3 percent of a di- or polycarboxylic acid, e.g., terephthalic acid. Blending may take place in conventional rubber mixing equipment, e.g., a Baker-Perkins mixer equipped with sigma blades, an extruder, roll mill, or in a Brabender machine. The amount of working to achieve thorough mixing is determined by the specific nature of the polymer, e.g., a commercially available vinyl acetate polyethylene copolymer (Alathon 3,170) is blended satisfactorily by running the Brabender machine for 15 minutes at 110° C. Others require somewhat different times and temperatures.

The blended material may be sheeted out into a film which then can be used as an adhesive to join metal sheets.

In this specification and the claims, the term polar copolymers of alpha-olefins containing pendant esters, amides, anhydride or carboxylic acid groups will be used, and will be understood to include ethylene/vinyl acetate/acrylic acid, ethylene/acrylic acid, ethylene/methacrylic acid, ethylene/alkyl acrylate, and ethylene/vinyl ester copolymers. Polyolefin polymers and copolymers to which have been grafted polymers of maleic acid or anhydrides, esters, or amides thereof are also included. Graft copolymers of alpha-olefins with fumaric acid or anhydrides, esters, or amides thereof are also operable.

The amount of the di- or polycarboxylic acid adhesion promoters is not especially critical. One to 15 percent by weight of the copolymer in most instances appears to give substantially optimum results. More may be required with certain polymers, but in general, amounts of adhesion promoters in excess of 20 percent appear to be unnecessary.

As is customary in the technology of thermoplastic compositions, the copolymer can be compounded with conventional additives which may include fillers, antioxidants, pigments, antistatic agents, oil base extender plasticizers, or tackifiers. e.g., the compound may include fillers such as clay and the like, pigments such as carbon black, tackifiers such as modified rosin or polybetapinene, and extenders and plasticizers of numerous proprietary formulations. All additives may be used in the conventional proportions used in "rubber" compounds, i.e. from 0.5-200 parts or more per 100 parts of polymer by weight. Preferably, quantities will lie between 0.5 and 100 parts of additive. Additives may be added to the composition in conventional compounding equipment, e.g., a Baker-Perkins mixer or a screw-type extruder.

The metal surface to be united by the composition of the instant invention can be either untreated (bare metal or metal oxide surfaces) or surface treated. By the terms "surface treated" or "surface treatments" I mean the superposition on the metal surface of inorganic, organic or inorganic-organic layers or coatings of one sort or another, the purposes of said layers or coatings being to protect the metal surface from environmental corrosion, to protect the contents of the cans from contamination, or to decorate the can in an esthetic or practical manner. Examples of these surface treatments include but are not limited to chromium metal and/or chromium oxide species; phosphorus atoms or various phosphate compounds; zinc-containing primers; vinyl based, butadiene based, phenolic based or epoxy based lacquers and the like. If desired, a combination of two or more surface treatments can be employed in practicing this invention.

Various metals are operable and include, but are not limited to, steel, aluminum, tin-free steel, tin plate, aluminum coated steel, chromium coated steel, surface treated aluminum, surface treated steel, copper, brass and the like.

Although the invention is operable with the polymers which have previously been listed, the invention will be explained by using as an example the copolymer of ethylene and vinyl acetate. A large family of such copolymers is available on the market, among them being materials sold under the trademark "Elvax" and "Alathon" manufactured by the E. I. Dupont de Nemours & Co. and "Zetafax 1,570 Series" manufactured by Dow Chemical Co.

The general procedure in performing this invention is to work the polymer and the adhesive promotor in conventional rubber-working equipment, e.g., a Brabender machine, a Baker-Perkins, or Banbury mixer, a two-roll rubber mill, and like equipment.

The temperatures at which the polymer is worked are determined by the nature of the polymer and may range from room temperature to as much as 200° C. Usually all compounding additions are made and milled into the polymeric mass prior to the addition of the promoting agent, but if the polymer is easily worked, all ingredients may be added to the mixing apparatus at the same time.

Milling, as is conventional in rubber-mill practice, may be carried on for periods of from 2-15 minutes. Subsequent to milling, the material may be given a shape in which it will become useful as an adhesive, e.g., it may be sheeted out, slit into a tape, or formed into a ribbon. It also may be used as an adhesive when in the form of powder or pellets. The manufacture of such forms is a well-understood art. Whatever the form of the blended polymer which may be utilized, it is used as an adhesive by pressing it between laminae of substrate material which then are heated to at least above the melting point of the copolymer. X The following examples are set out to explain but expressly not limit the invention. Unless otherwise noted, all parts and percentages are by weight.

EXAMPLE 1

1.2 parts by weight of terephthalic acid was blended into 40 parts by weight of a copolymer of ethylene and vinyl acetate (Alathon 3,170, manufactured by Dupont), by working the mixture in a Brabender machine for 15 minutes at 110° C. The blend was then worked into a 10 mil film at a working temperature of 110° C. The resulting film was cut into small sections and used to bond test pieces of "TFS" steel (tin-free steel) by pressing a section in which the steel formed the top and bottom layers in a hydraulic press held at 210° C. The strips of steel were 1 inch wide by 3 inches long, and were of various thicknesses from 0.009 to 0.025 thick. The area of adhesive between the overlapped steel pieces was 1¼inch by 1 inch. Bearers were placed between the platens of the press so that the final thickness of adhesive was between 3 and 5 mils.

Prior to closing the press, the sandwich lay on the hot platen for a few seconds and then the press was closed at a pressure of 40,000 lbs. p.s.i. gauge. The samples were allowed to cool and age for a short period (averaging over night) and then were tested for peel strength. Tests were run at room temperature, i.e., 25° C. on a Scott tensile tester at a pull rate of 1 inch per minute. The test was conducted in accord with the procedure set forth in ASTMS 1,876–6–61T. Peel strengths of 30 lbs./in. were developed.

EXAMPLE 2

As a contraexample, the procedure of example 1 was followed in all respects except that the terephthalic acid was omitted. Various attempts at obtaining adhesion by the use of differing temperatures and pressures were complete failures. No adhesion was achieved.

EXAMPLE 3

A graft copolymer of acrylic acid and polyethylene (QX 2,375, Dow Chemical Company) was used as a base polymer. This material itself bonds to steel, and when pressed between test strips of steel as set forth in example 1, produced peel strengths of approximately 30 lbs. When 3 percent of terephthalic acid was blended into the polymer by working the mixture in a "Brabender" for approximately 15 minutes at 110° C. and thereafter was sheeted out to produce a film of 5 mils thickness, peel strengths of 67 lbs. were developed when using the same press and heat conditions as used in example 1.

As is apparent, the utility of this simple-bonding composition is not limited to cans or lapped joints. Rubber can be bonded to metal by the procedure, and many composite parts formed of elastomeric substances can be successfully joined to metal bases. The material is also useful in joining or laminating wood. It will also form an impervious, resistant, clear coating on wood by pressing the compounded polymer against the wooden part. To prevent adhesion and damaging of the upper exposed surface while the polymer is curing, it is recommended that a protective film of a heat-resistant composition such as a sheet of polyethylene terephthalate ("Mylar") be placed on top of the polymer and below the upper platen before the press is closed.

EXAMPLE 4

100 parts of commercially available ethylene/acrylic acid copolymer having a melt index of 12.6, a reduced specific viscosity of 0.94, a density of 0.930, and containing 1.05 mils/g. copolymer sold under the trade name of "Alathon 80F" by E. I. duPont de Nemours & Co., and 3 parts by weight of terephthalic acid is charged into a Brabender plastograph and milled at 110° C. for 10 minutes. The charge is dumped and compression-molded on a platen press at 110° C. to produce a sheet of 20 mil thickness. A strip of the said sheet was placed on top of a piece of plywood of 2×3 inches by one-fourth of an inch in size and covered with a "Mylar" sheet. The sandwich is heated in a platen press at 160° C. with the platens just closed for 2 minutes. The press is then closed at a guage pressure of 5,000 lbs. The pressure is maintained for 3 minutes. After the test piece has been removed from the press and allowed to cool to room temperature, the Mylar sheet is stripped off. A smooth, water-repellant, glossy, solvent-resistant, and abrasion- resistant coating of the composition is adhesively jointed to the plywood. Any attempt to remove this coating from the plywood will result in tearing the wood fibers.

EXAMPLE 5

As a control sample, the procedure of example 4 is followed in all respects except that no terephthalic acid was used. The film which was formed on the face of the plywood could be lifted off almost in its entirety without damage to the wood fiber.

The simplicity of the composition and the ease with which wood and metal parts may be joined, and its relative cheapness make the invention a particularly significant contribution because of the low cost, availability of materials, and the ease of joining of both organic and metal structures.

EXAMPLE 6

100 parts of a commercially available ethylene ethyl acrylate copolymer having a melt index of 2.5 (Zetafin 35, Dow Chemical Co.) is blended with 3 percent maleic acid in a Brabender plastograph at 160° C. for 15 minutes and then sheeted out to form a film 0.003–0.005/in. thick. When the film was interposed between two-TFS sheets and held under pressure at a temperature of 290° C. for 5 minutes, peel strengths of 20–30 lbs./in. were obtained when the sheets were cooled.

EXAMPLE 7

Example 6 was repeated except that 100 parts of ethylene-vinyl acetate copolymer commercially available under the trade name "Elvax" from E. I. duPont de Nemours & Co. was substituted for the 100 parts of ethylene-ethyl acrylate copolymer. The peel strength obtained was comparable to those obtained in example 6.

EXAMPLE 8

Example 6 was repeated that 100 parts of a modified ethylene-acrylic acid copolymer in which the acid has been converted to the amide was substituted for the ethylene-ethyl acrylate. The copolymer contained at least 50 mole percent ethylene and has a reduced specific viscosity in excess of 0.5 dls./g. and is commercially available from Isochem Corp. under the trade name "ISOREZ PE 50."The peel strength obtained was comparable to that obtained in example 6.

Various di- and polycarboxylic acids are operable in the instant invention. Examples of said acids include, but are not limited to, terephthalic acid, pyromellitic acid, phthalic acid, maleic acid, fumaric acid, mellitic acid, citraconic acid, glutaric acid, citric acid, aconitic acid, malic acid, azelaic acid, pyrotartaric acid, mucic acid, muconic acid, pyromucic acid, acetone dicarboxylic acid, diglycolic acid itaconic acid, tricarballylic acid, diphenic acid, trimesic acid, naphthalic acid, phrenitic acid, alginic acid and the like.

What is claimed is:

1. An process of joining sheets selected from the group consisting of metal and wood which comprises interposing between said sheets a layer of a thermoplastic copolymer of ethylene and at least one member selected from the group consisting of acrylic, methacrylic, maleic and fumaric acids, alkyl esters thereof, and acrylamide, methacrylamide, maleic anhydride, fumaric anhydride and vinyl alkanoic acid esters compounded with 1–15 percent by weight of said copolymer of an adhesion promoting agent selected from the group consisting of monomeric, low-molecular weight dicarboxylic acids and polycarboxylic acids, heating the thus formed sandwich under pressure to a temperature above the melting point of the copolymer and thereafter releasing the pressure and cooling the laminated sheets below the melting point of the copolymer thereby forming a joint between said sheets.